United States Patent [19]

Oohara

[11] Patent Number: 4,550,147
[45] Date of Patent: Oct. 29, 1985

[54] RUBBER COMPOSITION WITH TRITHIOL TRIAZINE AND COBALT SALT

[75] Inventor: Riichiro Oohara, Suita, Japan

[73] Assignee: The Toyo Rubber Industry Co., Ltd., Osaka, Japan

[21] Appl. No.: 649,162

[22] Filed: Sep. 10, 1984

Related U.S. Application Data

[63] Continuation of Ser. No. 356,639, Mar. 10, 1932, abandoned.

[51] Int. Cl.[4] .............................................. C08F 19/20
[52] U.S. Cl. .................................. 525/332.6; 525/133; 525/348
[58] Field of Search ...................... 525/348, 370, 332.6

[56] References Cited

U.S. PATENT DOCUMENTS 3,366,598  1/1968  Westlinning ........................ 525/348
3,993,847  11/1976  Kondo ............................. 156/110 A Primary Examiner—Christopher A. Henderson
Attorney, Agent, or Firm—Koda and Androlia

[57] ABSTRACT

A rubber composition having satisfactory adhesion brass plated steel cords which does not substantially degrade with high humidity comprising 0.5 to 5 parts by weight of cobalt salt and 0.1 to 5 parts by weight of 1,3,5-triazine-2,4,6-trithiol as the adhesive component; or further including as the adhesive component 0.5 to 5 parts by weight of resorcinol or substituted phenol-formaldehyde resin and 0.5 to 5 parts by weight of melamine derivative represented by the formula:

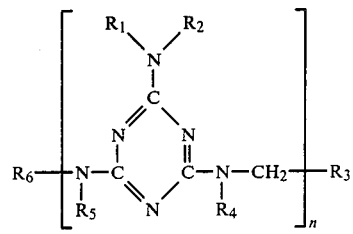

wherein in the formula above $R_1$, $R_2$, $R_4$ and $R_5$ are radicals selected from the group consisting of $-CH_2OH$, $-CH_2OCH_3$ and $-CH_2OC_2H_5$; $R_3$ is a radical selected from the group consisting of $-OCH_3$ and $-OC_2H_5$; $R_6$ is a radical selected from the group consisting of $-CH_2OCH_3$ and $-CH_2OC_2H_5$; and wherein n equals integer from 1 to 5.

2 Claims, No Drawings

RUBBER COMPOSITION WITH TRITHIOL TRIAZINE AND COBALT SALT

This is a continuation of application Ser. No. 356,639, filed Mar. 10, 1982, now abandoned.

BACKGROUND OF THE INVENTION

1. Field of the Invention

The present invention relates to rubber compositions and more particularly to a rubber composition having excellent moisture resisting adhesion and capable of preventing a decrease in the strength of adhesion with brass plate cords when exposed to high humidity.

2. Prior Art

Conventionally, as a means to improve the performance of an automobile tire, belt conveyor, etc., steel cords plated with brass have been widely used as a reinforcement. Also, composites for improving the adhesive property are compounded from one or more types of bonding agents selected according to requirements from the group consisting of resorcin, resorcin-formaldehyde resin, hexamethylenetetramine, melamine derivative, cobalt salt, etc., with various types of rubber composites have been known. These conventional rubber composites for steel cords, however, were disadvantages in that when exposed to high humidity, the rubber absorbs moisture, and particularly in an ambient temperature above 40° C. and a relative humidity at above 90 percent, the absorption of moisture by the rubber becomes substantially large. The absorption of moisture in the rubber causes an adverse effect on the interface of the adhesion between the steel cords and the rubber to allow the steel cord to separate from the rubber resulting in a shortened life for the product.

SUMMARY OF THE INVENTION

Accordingly, it is the general object of the present invention to provide a rubber composition capable of preventing a decrease in the strength of adhesion between steel cords plated with brass and the rubber in an ambient environment of high humidity.

The above-mentioned object is achieved by utilizing a rubber composition obtained by compounding both cobalt salt and 1,3,5-triazine-2,4,6-trithiol whose bonding force with brass scarcely decreases even at high humidity and in other words which has moisture resistant adhesion to brass in a satisfactory amount.

DETAILED DESCRIPTION OF THE INVENTION

The rubber composition of the present invention with excellent moisture resisting adhesion is characterized in that in various types of components compounded with 100 parts by weight of rubber are included 0.5 to 5 parts by weight cobalt salt (organic acid cobalt) and 0.1 to 5 parts by weight of 3,5-triazine-2, 4,6-trithiol represented by the following formula as the adhesive component.

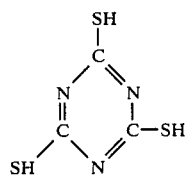

Cobalt salts to be compounded, for example, is cobalt naphthenate, cobalt stearate, cobalt octylate and cobalt tallate. The compounding ratio of the cobalt salt is 0.5 to 5 parts by weight. When the content of cobalt salt is less than 0.5 parts by weight, an insufficient effect results; whereas when the content exceeds 5 parts by weight, this causes a weakening of the physical properties of the rubber. The compounding ratio of the 1,3,5-triazine-2,4,6-trithiol is 0.1 to 5 parts by weight. When the content of this is less than 0.1 parts by weight, an insufficient effect results; while when the content exceeds 5 parts by weight, not only are the physical properties of the rubber degraded but also another disdavantage results in that the costs are increased.

In addition; it was also discovered that the moisture resisting adhesive properties can be further improved by compounding not only cobalt salt and 1,3,5-triazine-2,4,6-trithiol together but also resorcinol or substituted phenol-formaldehyde resin and melamine derivative jointly for other components.

In other words, the present invention also provides a rubber composition having more desirable adhesive properties by employing with 100 parts by weight of rubber, 0.5 to 5 parts by weight of cobalt salt, 0.1 to 5 parts by weight of 1,3,5-triazine-2,4,6-trithiol, 0.5 to 5 parts by weight of resorcinol or substituted phenol-formaldehyde resin and 0.5 to 5 parts by weight of melamine derivative.

When the above mentioned resorcinol or substituted phenol-formaldehyde resin and melamine derivative are utilized in amounts less than the amounts given above, insufficient effect results; while when their amounts exceed those given above, the properties of the rubber is degraded. The substituted phenol-formaldehyde resins utilized are such as resorcin-formaldehyde condensation product, cresol-formaldehyde condensate, P-alkyl-phenol-formaldehyde condensate, a condensate of a mixture of resorcinol and alkylphenol and formaldehyde.

The melamine derivatives which can be utilized are represented by the formula shown below.

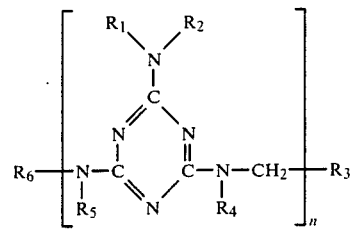

In the formula above, $R_1$, $R_2$, $R_3$, $R_4$, $R_5$ and $R_6$ are radicals selected optionally from the following groups: $R_1$, $R_2$, $R_4$ and $R_5$ from the group consisting of —CH$_2$OH, —CH$_2$OCH$_3$ and —CH$_2$OC$_2$H$_5$; $R_3$ selected from the group consisting of —OCH$_3$ and —OC$_2$H$_5$; and $R_6$ from the group consisting of —CH$_2$OCH$_3$ and —CH$_2$OC$_2$H$_5$; and n is within the range of 1 to 5. Particularly, the methylolmelamine derivatives wherein $R_3$ is —OCH$_3$ and the other radicals are —CH$_2$OH and —CH$_2$OCH$_3$ are preferable. Such melamine derivatives are obtained, for example, as starch syrup-like partially methoxylated methylol-melamine by methylating melamines with formaldehyde and further by methoxylating the objects with methyl alcohol.

In the rubber composition of the present invention the rubber component can be natural rubber and/or synthetic rubber. For the synthetic rubber, isoprene rubber is suitable. It goes without saying that other components such as vulcanizing agent, accelerator, antiozonant, carbon black, filler, etc. can be compounded together as ordinarily used according to necessity.

A further detailed description of the present invention will hereunder be given with reference to preferred examples.

In the examples preferred here, the results of tests conducted to evaluate the strength of adhesion with brass plated steel cords as well as the moisture resisting adhesion of the rubber composition of the present invention are shown. Shown in Table 1 are the various rubber compositions with their sample numbers and the test results are shown in Table 2.

TABLE 1

Rubber Compositions and Their Components

Parts by Weight

| | Embodiment | | | | | Comparison Embodiment | | |
|---|---|---|---|---|---|---|---|---|
| | Sample No. | | | | | | | |
| Component | 1 | 2 | 3 | 4 | 5 | 6 | 7 | 8 |
| Natural Rubber | 100 | 100 | 100 | 70 | 70 | 100 | 70 | 70 |
| Polyisoprene Rubber | — | — | — | 30 | 30 | — | 30 | 30 |
| Carbon Black (HAF) | 55 | 55 | 55 | 55 | 55 | 55 | 55 | 55 |
| Zinc Oxide | 7 | 7 | 7 | 7 | 7 | 7 | 7 | 7 |
| Stearic Acid | 2 | 2 | 2 | 2 | 2 | 2 | 2 | 2 |
| Antioxidant | 1 | 1 | 1 | 1 | 1 | 1 | 1 | 1 |
| Silica | — | — | — | 12 | 12 | — | 12 | 12 |
| Resorcinol | — | — | — | 2.5 | — | — | 2.5 | — |
| Cresol-formaldehyde Resin | — | — | — | — | 2.5 | — | — | 2.5 |
| Melamine Derivative | — | — | — | 2.5 | 2.5 | — | 2.5 | 2.5 |
| Cobalt Naphthenate | 2.5 | 2.5 | 2.5 | 2.5 | 2.5 | 2.5 | 2.5 | 2.5 |
| 1,3,5-Triazine-2,4,6-Trithiol | 0.5 | 1 | 3 | 1 | 1 | — | — | — |
| Sulfur | 5 | 5 | 5 | 5 | 5 | 5 | 5 | 5 |
| Vulcanization accelerator | 0.8 | 0.8 | 0.8 | 0.8 | 0.8 | 0.8 | 0.8 | 0.8 |

Note:
As the melamine derivative shown above, the mixture wherein $R_1$ is —$CH_2OH$, $R_3$ is —$OCH_3$, $R_2$, $R_4$, $R_5$ and $R_6$ are —$CH_2OCH_3$ and $n = 1$ to $3$ were utilized.
Antiozonant: Paraphenylenediamine series
Vulcanization accelerator: Sulfeneamide series Preparation of Samples and Peel Test Samples were prepared by inserting the brass-plated steel cords laid out in parallel rows (20 cords/2.5 cm) between two sheets of unvulcanized rubber composition listed in Table 1 having a thickness of 1 mm to form one layer, accumulating on said layer another layer prepared in the same manner to form two layered composition and curring the two layered composition for 45 minutes at 140° C. in a metal mold. Then, a test was conducted on said samples by peeling off one layer from the other to measure the adhesive force in kg per 2.5 cm in width as well as rubber coverage to the steel cords. The rubber coverage referred herein is taken as follows. When all of the forty steel cords on both peeled off surfaces are covered 100 percent with rubber, this is rated as 100; while when twenty steel cords in total on both separated surfaces are completely exposed, this rating is zero. A measurement of the examples was carried out immediately after vulcanization and after aging for one week and two weeks by leaving the examples at 70° C. and at 93 percent relative humidity respectively. The peel test were conducted at a peel angle of 180° at a rate of 50 mm per minute. The steel cords used in the structure are 1×5×0.25 mm which are brass plated with a layer of brass with a thickness of 2,800 Å by diffusion plating.

TABLE 2

Test Results

| | Embodiment | | | | | Comparison Embodiment | | |
|---|---|---|---|---|---|---|---|---|
| Physical | Sample No. | | | | | | | |
| Property | 1 | 2 | 3 | 4 | 5 | 6 | 7 | 8 |
| Immediately after curing | | | | | | | | |
| Peeling Force (kg) | 22.5 | 22.6 | 23.2 | 22.0 | 21.2 | 22.0 | 20.2 | 20.5 |
| Rubber Coverage (%) | 98 | 98 | 100 | 100 | 100 | 88 | 100 | 98 |
| After one week of aging | | | | | | | | |
| Peeling Force (kg) | 16.2 | 20.5 | 20.3 | 21.0 | 20.6 | 11.0 | 15.5 | 15.0 |
| Rubber Coverage (%) | 70 | 82 | 80 | 100 | 96 | 15 | 45 | 50 |
| After two weeks of aging | | | | | | | | |
| Peeling Force | 13.2 | 15.9 | 16.3 | 19.2 | 20.0 | 7.8 | 12.5 | 13.1 |
| Rubber Coverage (%) | 30 | 48 | 45 | 80 | 75 | 0 | 5 | 6 |

In Table 2 shown above, the samples 1 through 3 are examples of the present invention and it is apparent from them that compared with the sample No. 6 (comparison sample), the peel force and rubber coverage after aging with moisture and heat are improved. The samples Nos. 4 and 5 are further examples of the present invention and there is an evident improvement in the peel force as well as rubber coverage after aging with heat and moisture in comparison with the sample Nos. 7 and 8 (comparison samples) and also have an improvement in their performance even over the sample Nos. 1 through 3 (other examples of the present invention).

It should be clearly understood from the foregoing description that the rubber composite according to the present invention is provided with great effects which substantially prevents degradation in the adhesion of the rubber with brass in ambient conditions of high humidity.

I claim:

1. A rubber composition including adhesive components of 0.5 to 5 parts by weight of cobalt salt and 0.1 to 5 parts by weight of 1,3,5-triazine-24,6-trithiol as to 100 parts by weight of rubber.

2. A rubber composition according to claim 1, wherein said cobalt salt is selected from the group consisting of cobalt naphthenate, cobalt stearate, cobalt octylate and cobalt tallate.

* * * * *